United States Patent [19]

Tulen et al.

[11] Patent Number: 4,533,001

[45] Date of Patent: Aug. 6, 1985

[54] MULTIPLE FIXTURE FOR REPLACING WORN HOE BITS

[76] Inventors: Jack A. Tulen, R.R. #1, Coatsworth, Ontario, Canada, NOP 1HO; James L. Tulen, R.R. #1, Wheatley, Ontario, Canada, NOP 2PO

[21] Appl. No.: 570,648

[22] Filed: Jan. 13, 1984

[51] Int. Cl.³ .......................... B25B 1/20; A01B 23/02

[52] U.S. Cl. .................................... 172/438; 172/540; 269/152; 269/254 CS; 269/37; 228/49.1; 29/281.4; 29/148.3

[58] Field of Search ............................ 29/148.3, 281.4; 228/49 R, 47, 212; 172/540, 438, 548, 556; 269/37, 45, 152, 254 CS, 71

[56] References Cited

U.S. PATENT DOCUMENTS

| | | | |
|---|---|---|---|
| 88,368 | 3/1869 | Cone | 172/550 |
| 2,597,742 | 5/1952 | Mahoney | 172/556 |
| 3,477,515 | 11/1969 | Kiemele | 172/96 |
| 3,613,211 | 10/1971 | Daggett | 29/281.4 |
| 4,033,270 | 7/1977 | Bezzerides | 172/540 |
| 4,124,157 | 11/1978 | Walker | 228/49 R |
| 4,276,686 | 7/1981 | Tulen | 29/281.1 |
| 4,410,048 | 10/1983 | Tulen | 172/540 |

*Primary Examiner*—Richard J. Johnson
*Attorney, Agent, or Firm*—Allen D. Gutchess, Jr.

[57] ABSTRACT

A multiple fixture is provided for aiding in affixing replacement spoons to worn teeth of a rotary hoe wheel. The fixture comprises a circular hub from which extends a plurality of generally equally-spaced, radially-disposed arms. The number of arms equal the number of teeth on the worn hoe wheel. Mounting members or plates are carried by the arms and replacement spoons are positioned and clamped thereon. The rotary hoe wheel is then aligned with the fixture hub and connected thereto with the replacement spoons positioned in contact with the worn end portions of the hoe teeth and welded to them.

19 Claims, 4 Drawing Figures

MULTIPLE FIXTURE FOR REPLACING WORN HOE BITS

This invention relates to a multiple fixture for replacing worn hoe bits on a rotary hoe wheel.

A mechanical hoe is used primarily for the purpose of breaking up soil and consists primarily of a plurality of spaced rotary hoe wheels which are mounted on a common rotatable shaft. Each of the rotary hoe wheels includes a hub having a central shaft opening with a plurality of teeth extending radially outwardly from the hub in substantially uniformly-spaced relationship. The free ends of the teeth terminate in digging spoons which become worn after a period of use because of the abrasive action of the soil. Heretofore, it was common to discard the worn rotary hoe wheel and replace it with a new one.

In accordance with our U.S. Pat. No. 4,276,686 issued July 7, 1981 and our U.S. Pat. No. 4,410,048 issued Oct. 18, 1983, the worn rotary hoe wheels need not be discarded and replaced entirely. Rather, replacement spoons can be welded to the worn teeth to provide new life for the rotary hoe wheel. In accordance with those patents, a fixture is used to position and hold a single replacement spoon as it is welded to the worn tooth. This fixture, while being used effectively at this time, has been found to be somewhat time and labor consuming to weld a large number of replacement spoons, sixteen of them being typical, to a rotary hoe wheel. This is particularly true when it is considered that a large number of the rotary hoe wheels are employed on a single machine.

The present invention provides a multiple fixture for positioning and then welding all of the replacement spoons on a single rotary hoe wheel in one operation. The fixture comprises a central fixture hub which can have a shaft extending transversely outwardly from the center thereof with the shaft being part of the hub or separate therefrom. A plurality of arms, there being one for each worn tooth of the rotary hoe wheel, extend outwardly from the hub and are generally uniformly spaced therearound. The arms are radially adjustable on the hub and pivotally mounted for circumferential movement, as well as being spring loaded. Mounting members or plates are located at the ends of the arms and have positioning pins and clamps thereon for positioning and holding the replacement spoons. The mounting plates are located at specific angles relative to the arms and fixture hub to place the spoons in proper angular positions on the worn teeth.

After the replacement spoons are loaded on the mounting plates, the worn hoe wheel is positioned on the same shaft as the fixture and clamped to the fixture with the replacement spoons in contact with the worn, free end portions of the hoe teeth. All of the spoons are then welded to the worn teeth, after which the completed rotary hoe wheel is removed from the shaft and the next one can be inserted thereon after another set of replacement spoons are loaded on the mounting plates.

It is, therefore, a principal object of the invention to provide a multiple fixture for welding replacement spoons to worn rotary hoe wheels to reduce time and labor involved.

Another object of the invention is to provide a multiple fixture for welding a complete number of replacement spoons for a rotary hoe wheel whereby all of the spoons can be loaded at one time and then all welded at one time.

Many other objects and advantages of the invention will be apparent from the following detailed description of a preferred embodiment thereof, reference being made to the accompanying drawing, in which.

Figure 1:
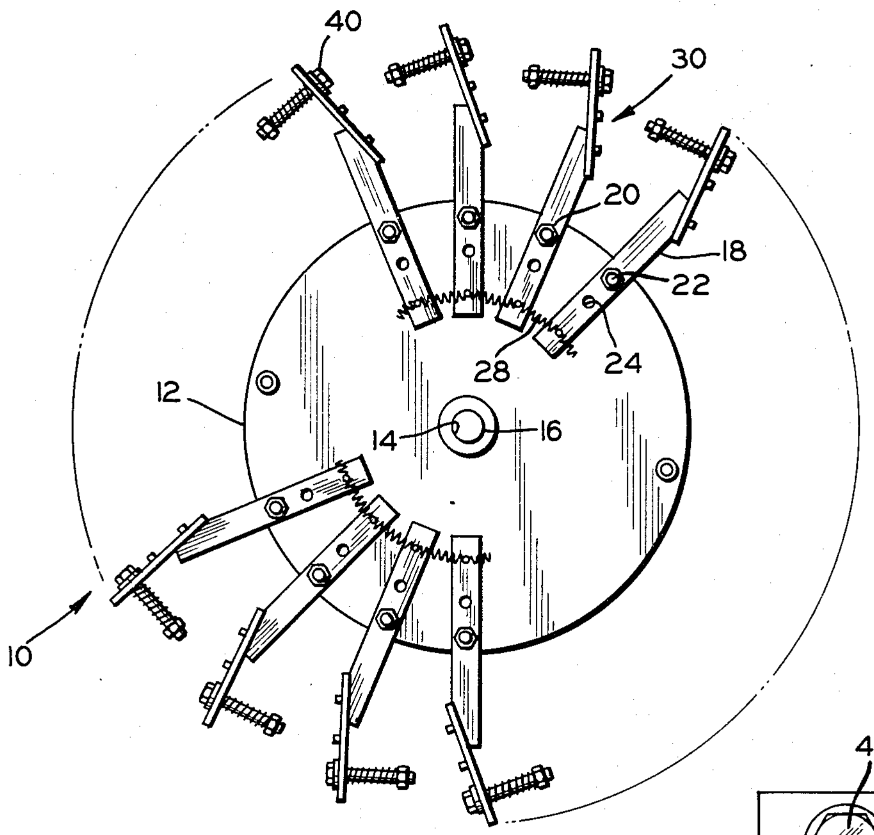
FIG. 1 is a back view in elevation of a multiple fixture in accordance with the invention.

Referring to FIG. 1 in particular, a multiple fixture embodying the invention is indicated at 10 and includes a circular disc or hub 12. The hub 12 has a central bore 14 which rotatably receives a shaft 16. The shaft 16 can be held in a suitable vice or the like, if desired, and it can be affixed to or separate from the hub 12.

Figure 2:
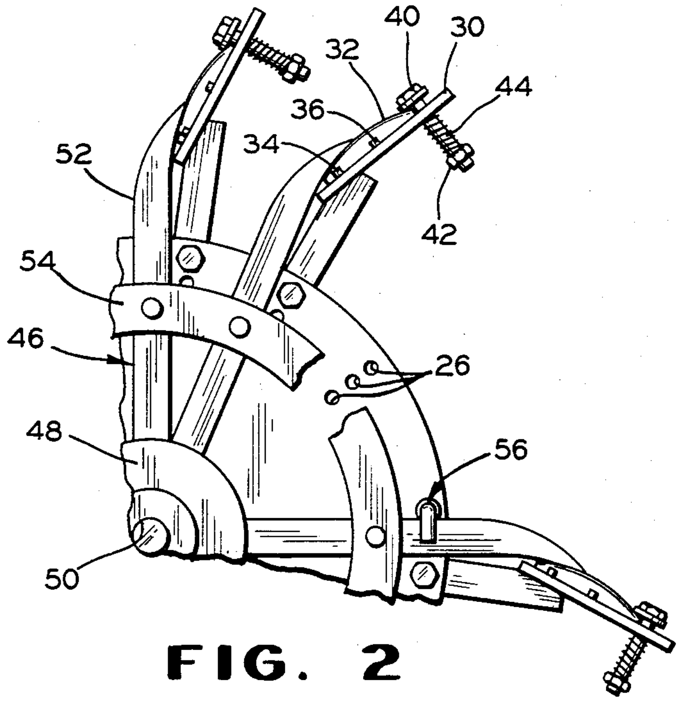
FIG. 2 is a fragmentary, front view in elevation of the fixture of FIG. 1 with a worn rotary hoe wheel positioned thereon and connected thereto.
Figure 4:
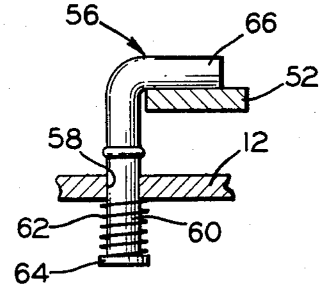
FIG. 4 is an enlarged, fragmentary view of a connecting hook or lug for connecting the rotary hoe wheel on the multiple fixture.

A plurality of generally radially-extending arms 18 extend outwardly from the hub 12 and are generally uniformly spaced therearound. The arms are connected to the hub 12 for limited pivotal movement by bolts 20 and nuts 22. The arms 18 are also radially adjustable to accommodate rotary hoe wheels having different degrees of wear. For this purpose, as shown, two bolt holes 24 are located along each of the arms 18 and three bolt holes 26 (FIG. 2) are located in radially different positions on the hub 12. Springs 28 connect the lower ends of the arms 18 to enable limited pivotal movements of the arms so that, when in welding position, the replacement spoons engage the worn teeth of a rotary hoe wheel with some pressure. The worn teeth, of course, do not wear entirely uniformly so that some limited circumferential degree of movement of the arms 18 is desired to accommodate variations in wear of the teeth.

Figure 3:
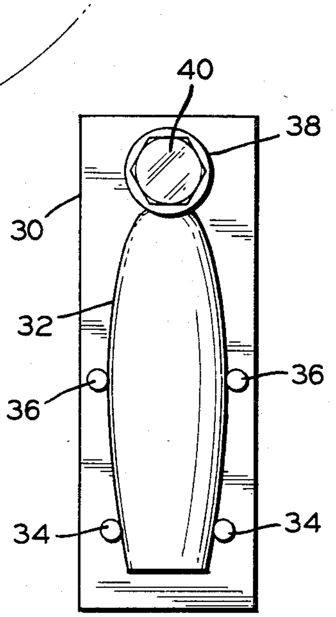
FIG. 3 is a front view in elevation of a mounting member or plate on which a replacement spoon is positioned and clamped.

A mounting member or plate 30 is affixed to the outer end of each of the arms 18 at an angle to the arms to provide the proper angle for a replacement spoon 32 (FIG. 3) relative to the worn teeth. The spoons 32 are shown and discussed more fully in our aforementioned patents. Positioning pins 34 engage edges of a lower end portion of the replacement spoon 32 and intermediate positioning pins 36, which are more widely spaced, engage and hold in position intermediate portions of the replacement spoon. An outer tip of the spoon is engaged between a face of the mounting plate 30 and a washer 38 to hold the spoon during welding. The washer receives a bolt 40 which extends through a hole in the mounting plate to a nut 42 on the opposite side with a spring 44 under compression located therebetween. The replacement spoons 32 can be quickly loaded on the mounting plate 30 by pushing outwardly on the ends of the bolts 40, slipping the tips of the spoons under the washers 38, and positioning them between the pins 34 and 36.

A worn rotary hoe wheel (FIG. 2) can be of either type shown in our aforementioned patents or of similar types. The wheel 46 has a hub 48 with a bore 50 which can be received on the shaft 16. A plurality of worn rotary hoe teeth 52 extend outwardly from the hub 48 and are held in equally spaced positions by a circular band 54. Spoons formerly at the outer ends of the teeth 52 are substantially worn away during operation of the hoe wheel.

After the replacement spoons 32 are located on the mounting plates 30, the worn hoe wheel 46 is placed on the shaft 16 concentrically with the multiple fixture 10. Springloaded lugs or hooks 56 are diametrically positioned on the fixture hub 12 and slidably received in openings 58 therein. The bolts 56 have shanks 60 extending through the holes with springs 62 located between the hub 12 and shoulders 64 at the end of the shanks. The opposite ends of the shanks have transversely-extending portions 66 which are pulled outwardly and turned 90 degrees over two of the teeth 52 to hold the hoe wheel 46 in place during welding. When properly positioned, the fixture holds the replacement spoon against the worn ends of the teeth even with some variations in wear, due to the resilient nature of the mounting of the arms 18. The spoons are located on the teeth so that at least an inch of weld bead on each side of the tooth can be used to affix each spoon. Further, the spoons 32 and the mounting plates 30 can be transversely moved to center the spoons on the teeth 52 by the welding operator during the welding operation. All sixteen of the replacement spoons 32 can then be welded at once to reduce the overall loading and weld time for the spoons. Once welded, the lugs 56 are turned ninety degrees and the rejuvenated rotary hoe wheel is removed, after which another is positioned after more replacement spoons are loaded on the mounting places.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A fixture for welding a plurality of replacement spoons to worn free end portions of teeth of a rotary hoe wheel, the rotary hoe wheel having a hub from which the teeth extend in substantially uniformly spaced relationship around the hub, said hub also having a central shaft opening, said fixture comprising a hub, a shaft extending transversely outwardly from the center of the fixture hub, a plurality of mounting members supported outwardly beyond said fixture hub, there being one of said mounting members for each of the free end portions of the rotary hoe wheel, each of said members having means for supporting a replacement spoon thereon in a predetermined position.

2. A fixture according to claim 1 characterized by said plurality of mounting members being adjustably supported to change the radial distances they extend beyond said fixture hub.

3. A fixture according to claim 1 characterized by each of said mounting members having means for positioning one end portion of a replacement spoon relative to the member and clamping means for clamping another end portion of the replacement spoon on the member.

4. A fixture according to claim 1 characterized by said fixture hub having means for releasably mounting the rotary hoe wheel on said fixture.

5. A fixture according to claim 1 characterized by a plurality of arms extending outwardly from said fixture hub supporting said plurality of mounting members.

6. A fixture according to claim 5 characterized by pivot means for pivotally mounting said arms on said hubs to enable circumferential movement of said mounting members.

7. A fixture according to claim 6 characterized by resilient means engaging said arms to urge said mounting members in circumferential directions.

8. A fixture according to claim 5 characterized by said arms being adjustably mounted on said fixture hub to enable radial adjustment of said mounting members.

9. In combination, a rotary hoe wheel having a hub, a plurality of teeth extending outwardly from said hub with worn free end portions, the hub having a central shaft opening, and a fixture for welding a plurality of replacement spoons to the worn free end portions of the teeth, said fixture comprising a fixture hub, a shaft extending transversely outwardly from the center thereof, and said central shaft opening being received on said shaft, a plurality of mounting members supported outwardly beyond said fixture hub, there being one of said members for each of the free end portions of the rotary hoe wheel, each of said members having means for supporting a replacement spoon thereon in a predetermined position.

10. The combination according to claim 9 characterized by said fixture having means for engaging at least one of said teeth to hold said rotary hoe wheel adjacent said fixture.

11. The combination according to claim 9 characterized by each of said members having means projecting therefrom to engage and position an end portion of a replacement spoon, each of said members also having clamping means for releasably holding another end portion of the replacement spoon.

12. The combination according to claim 9 characterized by each of said mounting members being affixed to an arm which extends outwardly from said fixture hub.

13. The combination according to claim 12 characterized by means for adjustably mounting each of said arms on said fixture hub for changing the positions of the mounting member relative to said fixture hub.

14. The combination according to claim 9 characterized by a plurality of arms pivotally supported by said fixture hub and extending outwardly therefrom with said mounting members being affixed to said arms.

15. The combination according to claim 14 characterized by resilient means engagable with said arms to urge said mounting members in circumferential directions.

16. A fixture for welding a plurality of replacement spoons to worn free end portions of teeth of a rotary hoe wheel or the like, the rotary hoe wheel having a hub from which the teeth extend in substantially uniformly spaced relationship around the hub, said fixture comprising a hub, a shaft extending transversely outwardly from the center of the fixture hub, a plurality of arms extending outwardly from said fixture hub and generally uniformly spaced around said fixture hub, there being one of said arms for each of the free end portions of the rotary hoe wheel, each of said arms having a mounting member thereon for supporting a replacement spoon in a predetermined position, and means mounting said arms on said fixture hub in a plurality of positions to support said mounting members at a plurality of different radial distances from said fixture hub.

17. A fixture according to claim 16 characterized by said fixture hub having means for releasably mounting the rotary hoe wheel on said fixture.

18. A fixture according to claim 16 characterized by pivot means mounting said arms on said fixture hub to enable circumferential movement of said mounting members, and resilient means connected to said arms for urging said mounting members in circumferential directions toward the free end portions of the teeth of the rotary hoe wheel.

19. A fixture according to claim 16 characterized by each of said mounting members having means thereon for positioning a portion of a replacement spoon thereon and clamping means for holding an end portion of the replacement spoon.

* * * * *